(12) United States Patent
Kongo et al.

(10) Patent No.: US 10,331,456 B2
(45) Date of Patent: Jun. 25, 2019

(54) SEWING MACHINE, START-UP MANAGEMENT METHOD FOR FIRMWARE, AND RECORDING MEDIUM FOR STORING PROGRAM

(71) Applicant: Janome Sewing Machine Co., Ltd., Tokyo (JP)

(72) Inventors: Takeshi Kongo, Tokyo (JP); Nobuhiko Kobayashi, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 201 days.

(21) Appl. No.: 15/494,944

(22) Filed: Apr. 24, 2017

(65) Prior Publication Data
US 2018/0018181 A1   Jan. 18, 2018

(30) Foreign Application Priority Data

Jul. 15, 2016 (JP) .................................. 2016-140361

(51) Int. Cl.
*D05C 9/00* (2006.01)
*D05B 19/08* (2006.01)
*D05B 19/12* (2006.01)
*G06F 9/4401* (2018.01)

(52) U.S. Cl.
CPC ........... *G06F 9/4401* (2013.01); *D05B 19/08* (2013.01); *D05B 19/12* (2013.01); *D05C 9/00* (2013.01)

(58) Field of Classification Search
CPC ....... D05B 19/08; D05B 19/12; G06F 9/4401; D05C 9/00
See application file for complete search history.

(56) References Cited

U.S. PATENT DOCUMENTS

| | | | |
|---|---|---|---|
| 6,098,158 A * | 8/2000 | Lay | G06F 9/4401 711/161 |
| 2007/0220246 A1* | 9/2007 | Powell | G06F 9/45533 713/2 |
| 2009/0063837 A1* | 3/2009 | Shayer | G06F 9/4401 713/2 |

FOREIGN PATENT DOCUMENTS

JP    2012-164106 A    8/2012

* cited by examiner

*Primary Examiner* — Terrell S Johnson
(74) *Attorney, Agent, or Firm* — Nakanishi IP Associates, LLC

(57) ABSTRACT

A loading order according to which function modules are to be loaded from a storage unit is determined based on a predicted use situation of a user. The function modules are loaded according to the loading order thus determined. Subsequently, the function modules thus loaded are started up according to a start-up instruction. With such an arrangement, by determining the loading order based on a prediction of the user's desired function, such an arrangement enables a reduction in the length of a loading time that bothers the user.

11 Claims, 13 Drawing Sheets

SEWING MACHINE, START-UP MANAGEMENT METHOD FOR FIRMWARE, AND RECORDING MEDIUM FOR STORING PROGRAM

CROSS REFERENCE TO RELATED APPLICATIONS

This application is based on and claims the benefit of priority to Japanese Patent Application No. 2016-140361 filed on Jul. 15, 2016, the contents of which are hereby incorporated by reference in their entirety.

BACKGROUND OF INVENTION

Field of the Invention

The present invention relates to a sewing machine, a start-up management method for managing firmware, and a recording medium for storing a program.

Description of the Related Art

In most cases, recent high-performance embedded systems are configured such that a program code is stored in ROM (Read Only Memory). With such an arrangement, when the power supply is turned on, the program code is transferred to RAM (Random Access Memory), and the program code thus transferred is executed in the RAM.

In a case of designing a high-grade sewing machine, a high-performance CPU is employed. Such a sewing machine is designed so as to operate according to a program executed in the RAM in the same way as described above (see Patent document 1, for example).

The reason why such a program code is transferred to the RAM is that ROM or F-ROM (flash ROM) involves a long access time as compared with RAM due to the mechanism involved in the semiconductor devices structure. Specifically, this is because the CPU requires a waiting time of two or three clocks to reliably read out a signal from ROM before the CPU reads out the signal, for example. In contrast, RAM has a semiconductor structure that provides an advantage of improved access time. That is to say, in a case in which the CPU reads out a signal from RAM, the CPU requires no waiting time or otherwise requires only a very short waiting time to reliably read out such a signal.

From the software viewpoint, a sewing machine is configured including various kinds of software modules. Examples of such software modules include: a control module for controlling the swing width in an ordinary sewing mode, for controlling a feed mechanism, and for controlling the up/down movement of a needle rod; a communication interface module for controlling USB communication, wireless LAN communication, and the like; a display module for displaying an operation manual in the form of a still image or a moving image; a screen display module for displaying multiple screens such as a basic operation screen, a GUI operation screen, and the like; an editor module for allowing the user to edit embroidery data; a simulation module for providing a simulation result in a three-dimensional display manner; and the like.

RELATED ART DOCUMENTS

Patent Documents

[Patent Document 1]

Japanese Patent Application Laid-Open No. 2012-164106

Accompanying improvements in the functions and improvements in the performance of such an embedded system, the embedded system requires large-scale firmware. This leads to an increase in the transfer time (loading time) required to transfer the firmware from the ROM to the RAM in the start-up operation when the power supply is turned on or otherwise after the system is reset. Such an arrangement has an adverse effect on the start-up time required for the overall start-up operation of the system, which is an issue.

In order to address such an issue, a technique is described in Patent document 1. That is to say, in the start-up operation, one load module group is selected from among the load module groups stored in the ROM, and necessary load modules are sequentially loaded to the RAM from the load module group thus selected according to a predetermined order. At the time point when the loading operation ends, the load modules thus loaded are started up.

With the technique described in Patent document 1, such necessary load modules are sequentially loaded to the RAM from the load module group thus selected according to a predetermined order designed giving consideration to the loading time, unlike conventional methods in which such load modules are sequentially loaded without giving consideration to the loading time. Thus, it is anticipated that such an arrangement has the potential to reduce the loading time.

However, with the technique described in Patent document 1, the necessary load modules are sequentially loaded to the RAM from the selected load module group according to a predetermined order that has been designed in a simple manner giving consideration to the loading time. That is to say, the technique described in Patent document 1 has no concept of judging which load module group is to be selected. That is to say, such an embedded device is not designed to detect the user's desired functions. Accordingly, from the user's viewpoint, in some cases, such an arrangement is not capable of reducing the loading time required for executing the user's desired functions. That is to say, in some cases, such an arrangement is not capable of meeting the demand for reducing the loading time, which is an issue.

SUMMARY OF THE INVENTION

Accordingly, the present invention has been made in order to address such an issue. It is a purpose of the present invention to provide a sewing machine configured to predict the user's desired functions so as to determine the order according to which the modules are to be sequentially loaded, thereby reducing the length of a loading time that bothers the user.

Embodiment (1)

One or more embodiments of the present invention provide a sewing machine comprising: a storage unit that stores a plurality of function modules; a loading order determination unit that determines, based on a use situation of a user, an order according to which the function modules are to be loaded from the storage unit; a loading unit that loads the function modules according to the loading order thus determined by the loading order determination unit; and a start-up unit that starts up the function modules loaded by the loading unit.

Embodiment (2)

One or more embodiments of the present invention also provide the sewing machine. Before the loading order determination unit determines the order according to which the function modules are to be loaded, a start-up operation table is generated, and the function modules to be loaded are registered in the start-up operation table thus generated.

Embodiment (3)

One or more embodiments of the present invention also provide the sewing machine. The sewing machine further comprises an embroidery frame detection sensor unit. When the embroidery frame detection sensor unit detects that an embroidery frame has been mounted, the loading order determination unit determines a loading order with the function module with respect to embroidery sewing as the highest-ranking from among the plurality of function modules.

Embodiment (4)

One or more embodiments of the present invention also provide the sewing machine. The sewing machine further comprises an embroidery unit sensor unit. When the embroidery unit sensor unit detects that an embroidery unit has been mounted, the loading order determination unit determines a loading order with the function module with respect to embroidery sewing as the highest-ranking from among the plurality of function modules.

Embodiment (5)

One or more embodiments of the present invention also provide the sewing machine. The sewing machine further comprises an embroidery unit sensor unit. When the embroidery unit sensor unit detects that an embroidery unit has been mounted, and when the embroidery unit sensor unit detects an open state of an arm of the embroidery unit, the loading order determination unit determines a loading order with the function module with respect to embroidery sewing as the highest-ranking from among the plurality of function modules.

Embodiment (6)

One or more embodiments of the present invention also provide the sewing machine. The sewing machine further comprises an embroidery unit sensor unit. When the embroidery unit sensor unit does not detect that an embroidery unit has been mounted, the loading order determination unit determines a loading order with the function module with respect to ordinary sewing as the highest-ranking from among the plurality of function modules.

Embodiment (7)

One or more embodiments of the present invention also provide the sewing machine. The sewing machine further comprises an operation history storage unit that stores an operation history of a user. The loading order determination unit determines a loading order with a function module related to the operation history of the user stored in the operation history storage unit as the highest-ranking.

Embodiment (8)

One or more embodiments of the present invention also provide the sewing machine. The sewing machine further comprises a score calculation unit that calculates a score for a user operation content by performing weighting determination based on the operation history of the user stored in the operation history storage unit. The loading order determination unit determines, based on the score calculated by the store calculation unit, a loading order according to which the plurality of function modules, which are related to the operation history of the user, are to be loaded.

Embodiment (9)

One or more embodiments of the present invention also provide the sewing machine. The sewing machine further comprises a setting unit that allows a user to make a setting with respect to whether or not a given function module is to be loaded.

Embodiment (10)

One or more embodiments of the present invention also provide the sewing machine. The sewing machine further comprises a file storage apparatus. After the loading unit loads the aforementioned function modules, the loading unit loads a function module for supporting files stored in the file storage unit.

Embodiment (11)

One or more embodiments of the present invention also provide the sewing machine. When the user performs an operation that requires a corresponding function module before a loading operation is completed for all the function modules, and when such a required function module has not been loaded, the loading operation that is being carried out is suspended, and the required function module for supporting the user's operation is loaded.

Embodiment (12)

One or more embodiments of the present invention provide a start-up management method for a firmware used in a sewing machine comprising a storage unit that stores a plurality of function modules, a loading order determination unit, a loading unit, and a start-up unit. The start-up management method comprises: determining, by the loading order determination unit, based on a use situation of the user, an order according to which the function modules are to be loaded from the storage unit; loading, by the loading unit, the function modules according to the loading order thus determined by the loading order determination unit; and starting up, by the start-up unit, the function modules loaded by the loading unit.

Embodiment (13)

One or more embodiments of the present invention provide a recording medium for storing a program for instructing a sewing machine to execute a start-up management method for a firmware used in the sewing machine. The sewing machine comprises: a storage unit that stores a plurality of function modules; a loading order determination unit; a loading unit; and a start-up unit. The start-up management method comprises: determining, by the loading order determination unit, based on a use situation of the user, an order according to which the function modules are to be loaded from the storage unit; loading, by the loading unit, the function modules according to the loading order thus determined by the loading order determination unit; and starting up, by the start-up unit, the function modules loaded by the loading unit.

At least one embodiment of the present invention provides the following advantage. That is to say, by determining the loading order based on a prediction of the user's desired function, such an arrangement enables a reduction in the length of a loading time that bothers the user.

BRIEF DESCRIPTION OF DRAWINGS

FIG. 5 is a flowchart showing the operation flow of the sewing machine according to the first embodiment of the present invention after the power supply is turned on.

FIG. 10 is a flowchart showing the operation flow of the sewing machine according to the first embodiment of the present invention after the power supply is turned on.

FIG. 13 is a flowchart showing the operation flow of the sewing machine according to the third embodiment of the present invention after the power supply is turned on.

DETAILED DESCRIPTION

Detailed description will be made with reference to the drawings regarding an embodiment of the present invention.

First Embodiment

Description will be made with reference to FIGS. 1 through 6 regarding a sewing machine according to a first embodiment.

[Configuration of Sewing Machine]

Figure 1:
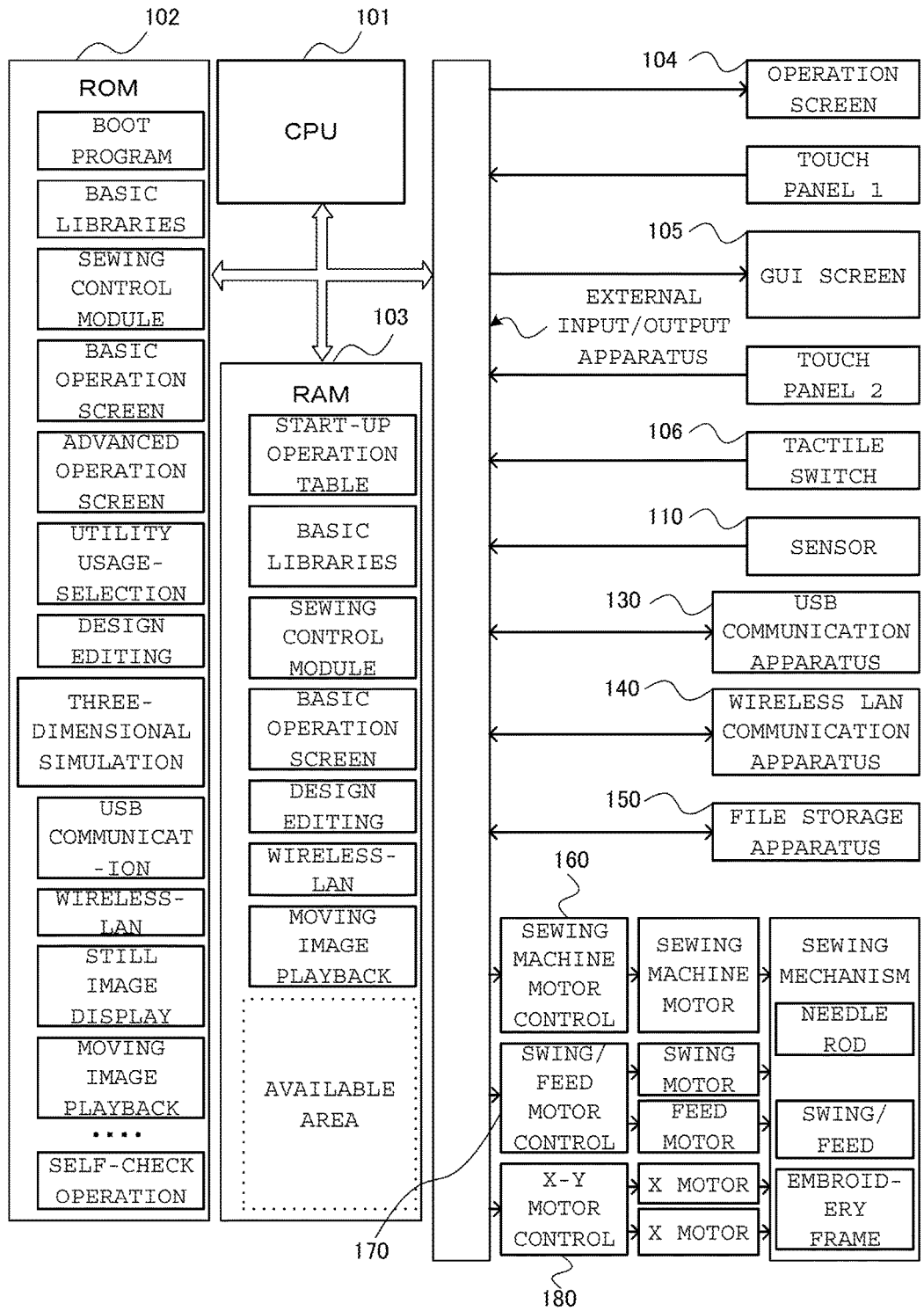
FIG. 1 is a block diagram showing a sewing machine according to a first embodiment of the present invention.

As shown in FIG. 1, the sewing machine according to the present embodiment has a configuration including a CPU 101, ROM 102, RAM 103, an operation screen 104, a GUI screen 105, a tactile switch 106, a sensor 110, a USB communication apparatus 130, a wireless LAN communication apparatus 140, a file storage apparatus 150, a sewing machine motor control apparatus 160, a swing/feed motor control apparatus 170, and an X-Y motor control apparatus 180.

The CPU 101 controls the overall operation of the sewing machine according to a control program. Furthermore, the CPU 101 is connected to various kinds of devices via an external input/output apparatus. The ROM 102 and the RAM 103 each function as a storage unit that stores function modules. The ROM 102 stores various kinds of function modules. Examples of such various kinds of function modules include a boot program, an OS and basic libraries, a sewing control module, a basic operation screen module, an advanced operation screen module, an ordinary sewing (utility, usage selection) module, an embroidery sewing (design editor) module, an embroidery sewing (3D simulation) module, a USB communication module (protocol), a wireless LAN communication module (TCP/IP protocol), a still image display module, a moving image data playback module, a self-check module, and the like.

The RAM 103 stores various kinds of function modules read out from the ROM 102. Examples of such various kinds of function modules include the OS and basic libraries, the sewing control module, the basic operation screen module, the embroidery sewing (design editor) module, the wireless LAN communication module (TCP/IP protocol), the moving image data playback module, and the like.

The operation screen 104 is combined with the touch panel 1, which allows the user to perform one-touch selection of basic operations for operating the sewing machine, and of frequently used designs such as a straight line design, zig-zag design, and the like. Furthermore, the operation screen 104 is configured to display guidance with respect to the sewing operation and to display warning messages.

The GUI screen 105 is combined with the touch panel 2. The GUI screen 105 is configured as a liquid crystal panel having a large display area with high resolution. The GUI screen 105 is configured to draw an embroidery design so as to allow the user to edit the embroidery design, to display a simulated sewing operation for forming such an embroidery design, and the like. Also, the GUI screen 105 is used to display the usage selection function for allowing the user to select a utility design used in the ordinary sewing operation, or otherwise for displaying a question from the sewing machine with respect to the purpose of use and receiving an answer from the user so as to select a design.

The tactile switch 106 is configured as a group of operation buttons such as a sewing machine start/stop button, a reverse stitching instruction button, a tacking instruction button, a needle rod up/down driving operation instruction button, a thread cutting instruction button, an automatic threading instruction button, and the like. The sensor 110 is configured including an embroidery frame detection sensor, and an embroidery unit sensor.

The USB communication apparatus 130 is configured including a USB target controller. The USB communication apparatus 130 is connected to a computer such as a personal computer via a USB cable, which allows data transmission and reception to be performed between them. The wireless LAN communication apparatus 140 allows the sewing machine to communicate with other network devices and to connect with the Internet via a public line after the wireless LAN communication apparatus 140 establishes a wireless connection with an external wireless LAN access point.

The file storage apparatus 150 is configured as large-capacity flash memory. The file storage apparatus 150 provides a function as a file system for storing various kinds of data such as embroidery data, image data, moving image data, and the like, in the form of files.

The sewing machine motor control apparatus 160 rotationally drives a sewing machine motor according to an instruction received from the CPU 101, so as to move the needle rod up and down, thereby forming a stitching pattern. The swing/feed motor control apparatus 170 drives a swing motor according to an instruction received from the CPU 101, so as to swing the needle rod, thereby providing a zig-zag operation for the needle rod. Furthermore, the swing/feed motor control apparatus 170 drives the feed motor according to an instruction received from the CPU 101, so as to control the cloth feed amount and the cloth feeding in the forward and backward direction. The combination of the sewing machine motor and the swing/feed motor allows the sewing mechanism to be controlled, which provides various kinds of stitching patterns such as straight line stitching patterns, zig-zag stitching patterns, and design stitching patterns.

The X-Y motor control apparatus 180 drives an X motor and a Y motor according to an instruction received from the CPU 101, so as to move the embroidery frame of the sewing mechanism in the X direction and in the Y direction. That is to say, by transmitting the instructions to the X motor and the Y motor, such an arrangement allows the needle location point to be determined. Furthermore, by driving the needle rod up and down by the sewing machine motor, an embroidery stitching pattern is formed, thereby providing an embroidery design.

Upon turning on the power supply for the system, first, the CPU 101 directly executes the "boot program" in the ROM 102. The "boot program" provides a transfer operation for transferring predetermined program modules, i.e., the "OS and basic libraries" module, the "sewing control" module, and the "basic operation screen" module, to the RAM 103. Subsequently, the "boot program" starts up the program modules thus transferred to the RAM 103. This provides an initializing operation for the sewing machine. In this stage, such an arrangement allows the user to use the basic functions as a sewing machine via the "basic operation screen".

The "OS and basic libraries" module expands a "start-up operation table" stored in the file storage apparatus 150 in the RAM 103. With such an arrangement, the "start-up operation table" is configured as a listing of the function modules to be loaded. After the "start-up operation table" is expanded in the RAM 103, the boot program loads the necessary program modules as a background operation of the sewing machine operation according to the "start-up operation table".

For example, let us consider a case in which an embroidery unit is mounted on the sewing machine, the wireless LAN function is enabled, and moving image files are stored in the file storage apparatus 150. In this case, it can be assumed that the sewing machine will be used as an embroidery sewing machine. Accordingly, the "embroidery sewing/design editor" module is loaded. Furthermore, the "wireless LAN communication" module is loaded according to the enabled state of the wireless LAN function. Moreover, the "moving image playback" module is loaded to the RAM 103 according to the fact that the moving image files have been stored in the file storage apparatus 150.

It should be noted that, in this stage, many other modules such as the "self-check" module, the "USB communication protocol" module, the "embroidery sewing (3D simulation)" module, and the like, have not been loaded. That is to say, the start-up operation is performed after only the required function modules are loaded. Thus, such an arrangement provides a high-speed start-up operation immediately after the power supply is turned on. Subsequently, when the user performs a selection operation for selecting the "advanced operation screen (GUI)" via the "basic operation screen", for example, the "advanced operation screen (GUI)" module is loaded and started up.

[Electrical Configuration of Sewing Machine]

Figure 2:
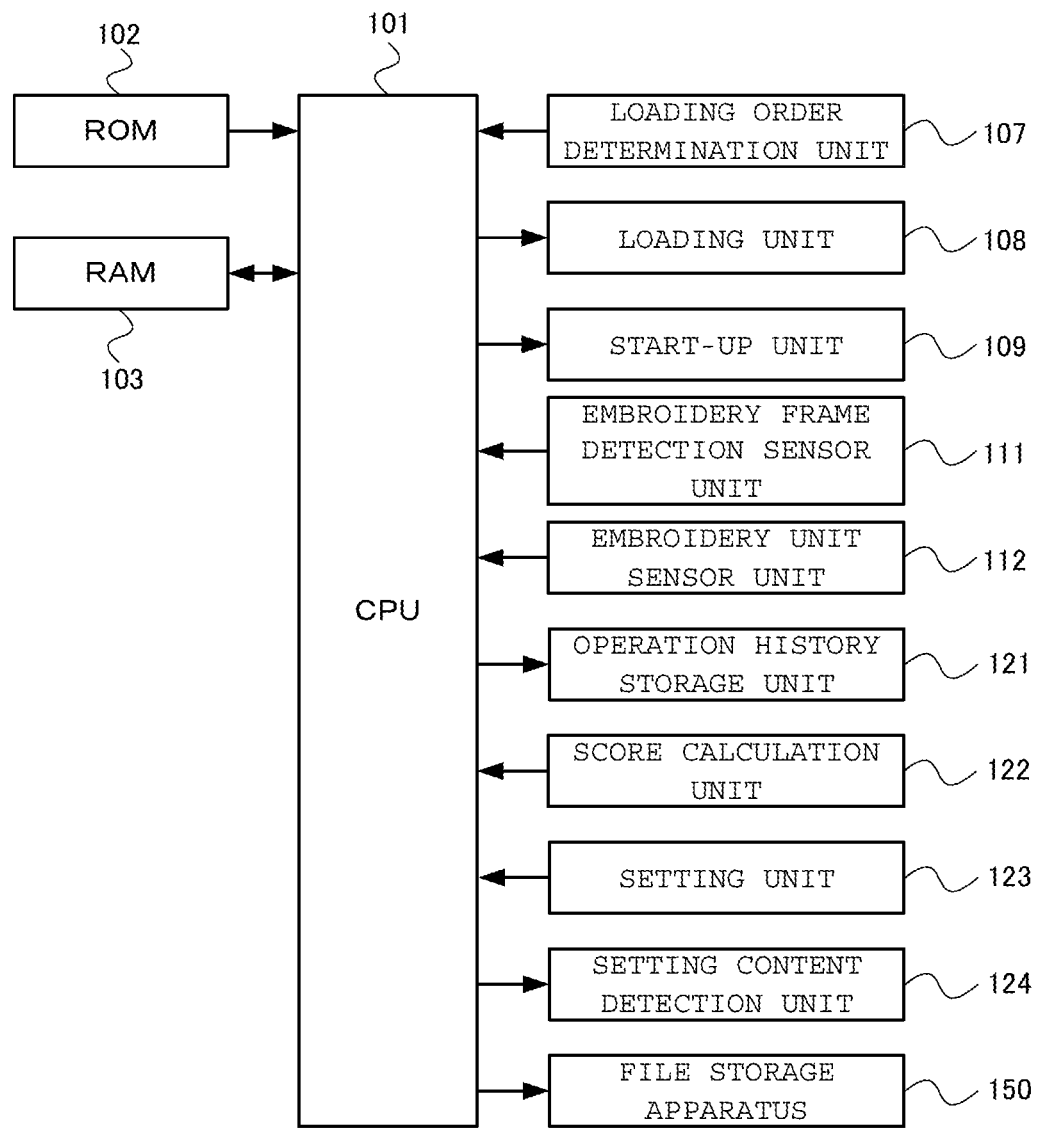
FIG. 2 is a diagram showing an electrical configuration of the first embodiment of the present invention.

As shown in FIG. 2, the sewing machine according to the present embodiment includes the CPU 101, the ROM 102, the RAM 103, a loading order determination unit 107, a loading unit 108, a start-up unit 109, an embroidery frame detection sensor unit 111, an embroidery unit sensor unit 112, an operation history storage unit 121, a score calculation unit 122, a setting unit 123, a setting content detection unit 124, and a file storage apparatus 150.

The ROM 102 stores multiple function modules in the form of divided modules. The loading order determination unit 107 determines, based on the operation type according to the use situation of the user, the order according to which the function modules are to be sequentially loaded from the ROM 102. Examples of such an operation type according to the use situation of the user include: embroidery sewing, wireless LAN connection, USB connection, moving image file storage, and the like. Examples of a function module that corresponds to such an operation type according to the use situation of the user include: an embroidery sewing module, a wireless LAN module, a USB communication module, a moving image playback module, and the like. The loading unit 108 loads the function modules according to the loading order determined by the loading order determination unit 107. Upon receiving a start-up instruction, the start-up unit 109 starts up the function modules thus loaded by the loading unit 108, according to the start-up instruction.

The embroidery frame detection sensor unit 111 detects whether or not the embroidery frame has been mounted. When the embroidery frame detection sensor unit 111 detects that the embroidery frame has been mounted, the loading order determination unit 107 sets the function module with respect to the embroidery sewing to be the highest-ranking function module in the loading order from among the multiple function modules. With this order modification operation, the loading order is updated in the start-up operation table.

The embroidery unit sensor unit 112 detects whether or not the embroidery unit has been mounted. When the embroidery unit sensor unit 112 detects that the embroidery unit has been mounted, the loading order determination unit 107 sets the function module with respect to the embroidery sewing to be the highest-ranking function module in the loading order from among the multiple function modules. Furthermore, the embroidery unit sensor unit 112 detects whether or not the arm of the embroidery unit is in the open state. When the embroidery unit sensor unit 112 detects the open state of the arm of the embroidery unit, the loading order determination unit 107 sets the function module with respect to the embroidery sewing to be the highest-ranking function module in the loading order from among the multiple function modules.

Conversely, when the embroidery unit sensor unit 112 does not detect such a mounted embroidery unit, the loading order determination unit 107 sets the function module with respect to the ordinary sewing to be the highest-ranking function module in the loading order from among the multiple function modules.

The operation history storage unit 121 stores the operation history of the user. With such an arrangement, the loading order determination unit 107 sets, based on the operation history of the user stored in the operation history storage unit 121, the corresponding function module to be the highest-ranking function module in the loading order from among the multiple function modules.

The score calculation unit 122 applies weighting factors to the user's operation history so as to calculate a score. With such an arrangement, the loading order determination unit 107 determines the loading order such that the function modules are to be sequentially loaded in decreasing order of the score values calculated by the score calculation unit 122. Here, the weighting factors are determined based on the user's operation history stored in the operation history storage unit. Specifically, the weighting factors are determined based on the values with respect to the user's operation such as the elapsed time, the frequency of use, and the like, or based on the most recent operation content. In a case in which there are multiple function modules with respect to a given user's operation history, the priority for the loading of each function module is determined based on the value of the weighting factor, thereby determining the start-up mode.

Furthermore, the loading order determination unit 107 determines the highest-ranking function module in the loading order, based on the detection results obtained by the embroidery frame detection sensor unit 111 and the embroidery unit sensor unit 112 and the user's operation history stored in the operation history storage unit 121.

The setting unit 123 allows the user to perform a setting of whether or not a given function module is to be loaded. That is to say, such an arrangement allows the user to select functions to be loaded, i.e., to select functions that are not to be loaded, as desired, from among the multiple functions prepared beforehand. The setting content detection unit 124 detects the setting content thus set by the user via the setting unit. Subsequently, when the setting content detection unit 124 detects communication or otherwise interface settings for communicating with an external apparatus, the loading order determination unit 107 modifies the loading order such that the function module with respect to the communication or otherwise the interface settings for communicating with the external apparatus is to be loaded next after the function modules that have already been determined in the loading order.

In a case in which an additional function module is prepared in order to support the files stored in the file storage apparatus 150, the loading unit 108 loads the additional function module that supports the files after the loading unit 108 loads the aforementioned function modules.

[Handling Steps Executed by Sewing Machine]

Description will be made with reference to FIGS. 3 through 6 regarding handling steps executed by the sewing machine according to the present embodiment.

After the user turns on the power supply for the sewing machine, the CPU, the OS, and the like, are initialized in the sewing machine. In this step, the start-up operation table is generated. Subsequently, the flow proceeds to operation reception handling. Detailed description will be made regarding each handling step with reference to specific examples shown in FIGS. 3 through 6. It should be noted that description will be made below with reference to an example in which the embroidery frame is mounted on the sewing machine, the wireless LAN function is enabled, and moving image files are stored in the file storage apparatus 150.

[Start-Up Operation Table Generating Handling Steps]

Before description of the actual handling steps, description will be made with reference to FIG. 3 regarding the outline of the start-up operation table generating steps.

Figure 3:
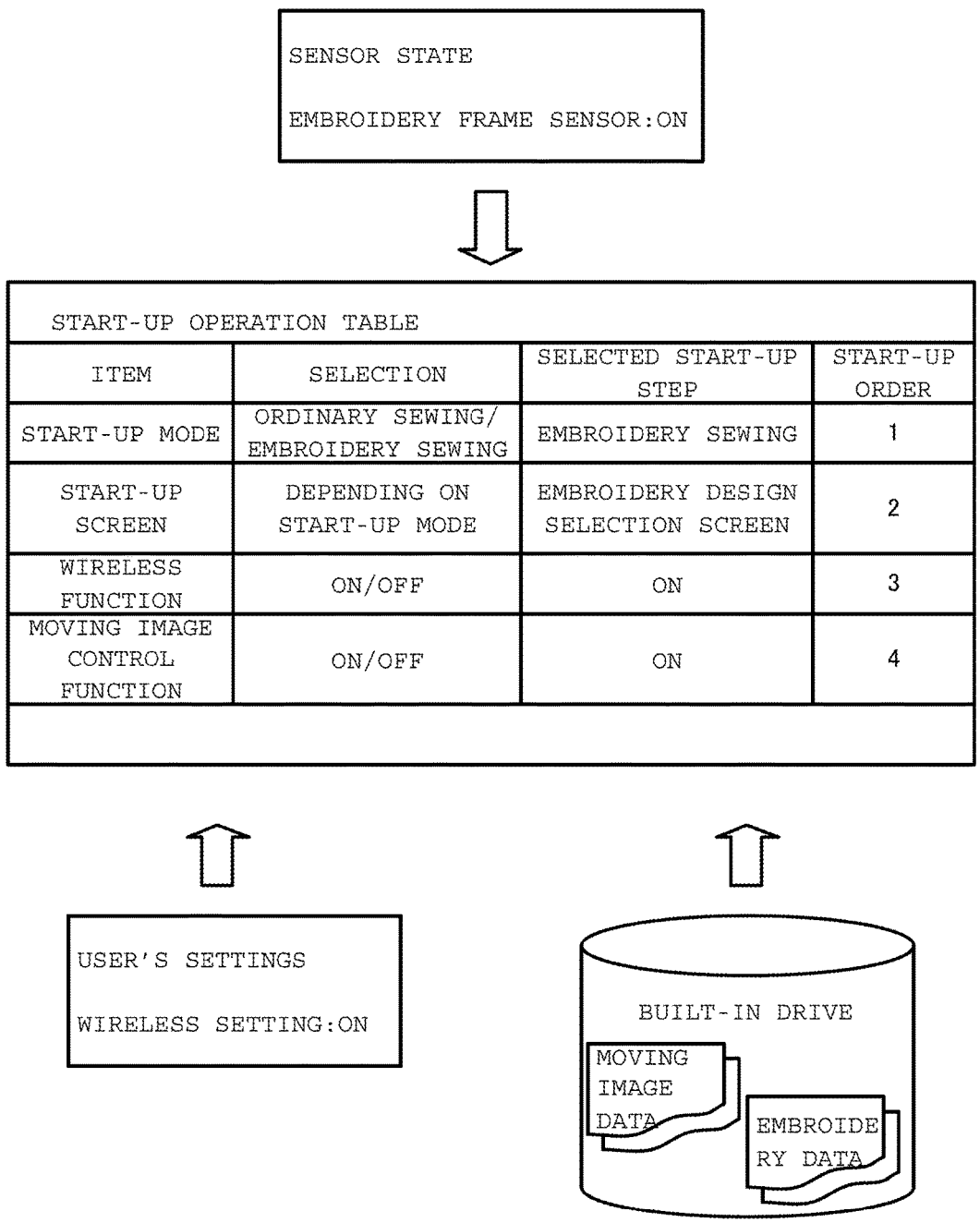
FIG. 3 is a diagram showing an outline of a start-up operation table generating steps performed by the sewing machine according to the first embodiment of the present invention.

In the present embodiment, as shown in FIG. 3, effective information that can be used to generate such a start-up operation table includes sensor state information, setting unit setting (user's setting) information, and built-in drive information. Specifically, judgement is made that the embroidery frame sensor indicates the ON state, based on the sensor state information. Furthermore, judgement is made that the wireless setting is to be enabled, based on the setting unit setting (user's setting) information. Moreover, such an arrangement acquires the information that the built-in drive stores the moving image data and the embroidery data.

The start-up operation table is generated based on the aforementioned information. First, judgement is made that the start-up mode is to be set to the embroidery mode based on the information that the embroidery frame sensor indicates the ON state. In this case, the start-up priority "1" is assigned to the embroidery mode. Next, judgment is made that the start-up screen is to be set to an embroidery design selection screen based on the information that the start-up mode is to be set to the embroidery mode. In this case, the start-up priority "2" is assigned to the embroidery design selection screen. Furthermore, judgment is made that the wireless function is to be enabled, based on the information that the wireless setting is "ON". In this case, the start-up priority "3" is assigned to the wireless function. Moreover, judgment is made that the moving image function is to be enabled based on the information that the built-in drive stores the moving image data. In this case, the start-up priority "4" is assigned to the moving image function. With the present embodiment, the start-up operation table is generated as described above.

Figure 4:
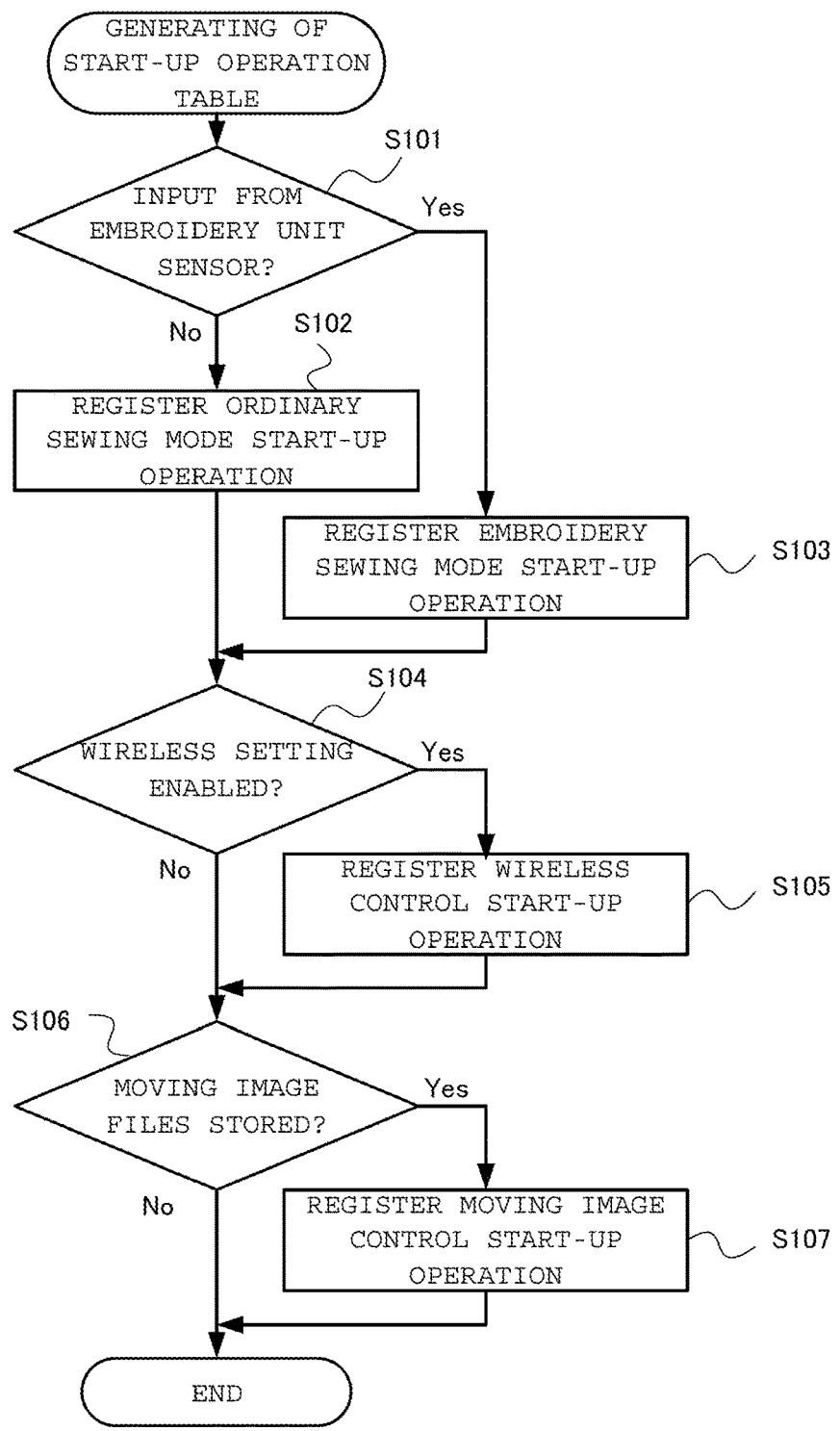
FIG. 4 is a flowchart showing the start-up operation table generating flow performed by the sewing machine according to the first embodiment of the present invention.

Description will be made below with reference to FIG. 4 regarding the start-up operation table generating handling steps according to the present embodiment based on a specific example of the aforementioned outline.

First, detection is made regarding the presence or absence of an input signal from the embroidery frame detection sensor (Step S101). When detection is made in this step that the input from the embroidery frame detection sensor is present ("YES" in Step S101), the "embroidery sewing mode" is registered in the start-up operation table (Step S103). Conversely, when detection is made that the input from the embroidery frame detection sensor is absent ("NO" in Step S101), the "ordinary sewing mode" is registered in the start-up operation table (Step S102). It should be noted that conventional sewing machines have included a built-in embroidery unit within the main body of the sewing machine, which allows the embroidery frame to be moved according to an embroidery design. In contrast, in recent years, such a sewing machine is provided with an embroidery unit configured as a unit separate from the main body of the sewing machine. However, in both types of sewing machines, the embroidery frame is mounted before the embroidery sewing is performed. Accordingly, the embroidery frame detection sensor may preferably be employed as a trigger. Specifically, when the signal input from the embroidery frame detection sensor is detected, judgment is made that there is a high probability that the user will operate in the embroidery sewing mode. Conversely, when the signal input from the embroidery frame detection sensor is not detected, judgment is made that there is a high probability that the user will operate in the ordinary sewing mode. Thus, mode determination is made based on the judgment results thus obtained. It should be noted that when the embroidery unit sensor unit 112 detects that the embroidery unit has been mounted, determination may be made that the embroidery sewing mode is to be used. Also, when the embroidery unit sensor unit 112 further detects that the arm of the embroidery arm has come to be in the open state, determination may be made that the embroidery sewing mode is to be used. Also, when the embroidery unit sensor unit 112 has not detected the mounted embroidery unit, determination may be made that the ordinary sewing mode is to be used. It should be noted that description is being made in the present embodiment regarding an example in which the embroidery frame detection sensor indicates the ON state. Accordingly, the "embroidery sewing mode" is registered in the start-up operation table.

Next, the setting content detection unit 124 detects the setting items set in the setting unit 123. For example, the setting content detection unit 124 detects whether or not the wireless setting is enabled in the setting unit 123 (Step S104). When the wireless setting is enabled ("YES" in Step S104), the wireless control start-up operation is registered in the start-up operation table (Step S105). It should be noted that description is being made in the present embodiment regarding an example in which the wireless setting is set to the ON state. Accordingly, the "wireless control start-up operation" is registered in the start-up operation table.

When the handling step represented by Step S105 ends, or otherwise in a case of "NO" in Step S104, the files stored in the file storage apparatus 150 are checked. For example, when the files stored in the file storage apparatus 150 include moving image files ("YES" in Step S106), the moving image control start-up operation is registered in the start-up operation table (Step S107). On the other hand, when the handling step represented by Step S107 ends, or otherwise in a case of "NO" in Step S106, the registration operation for the start-up operation table ends. It should be noted that description is being made in the present embodiment regarding an example in which the built-in drive stores moving image data. Accordingly, the "moving image control startup operation" is registered in the start-up operation table.

[Handling Steps after Power Supply is Turned on]

Figure 5:
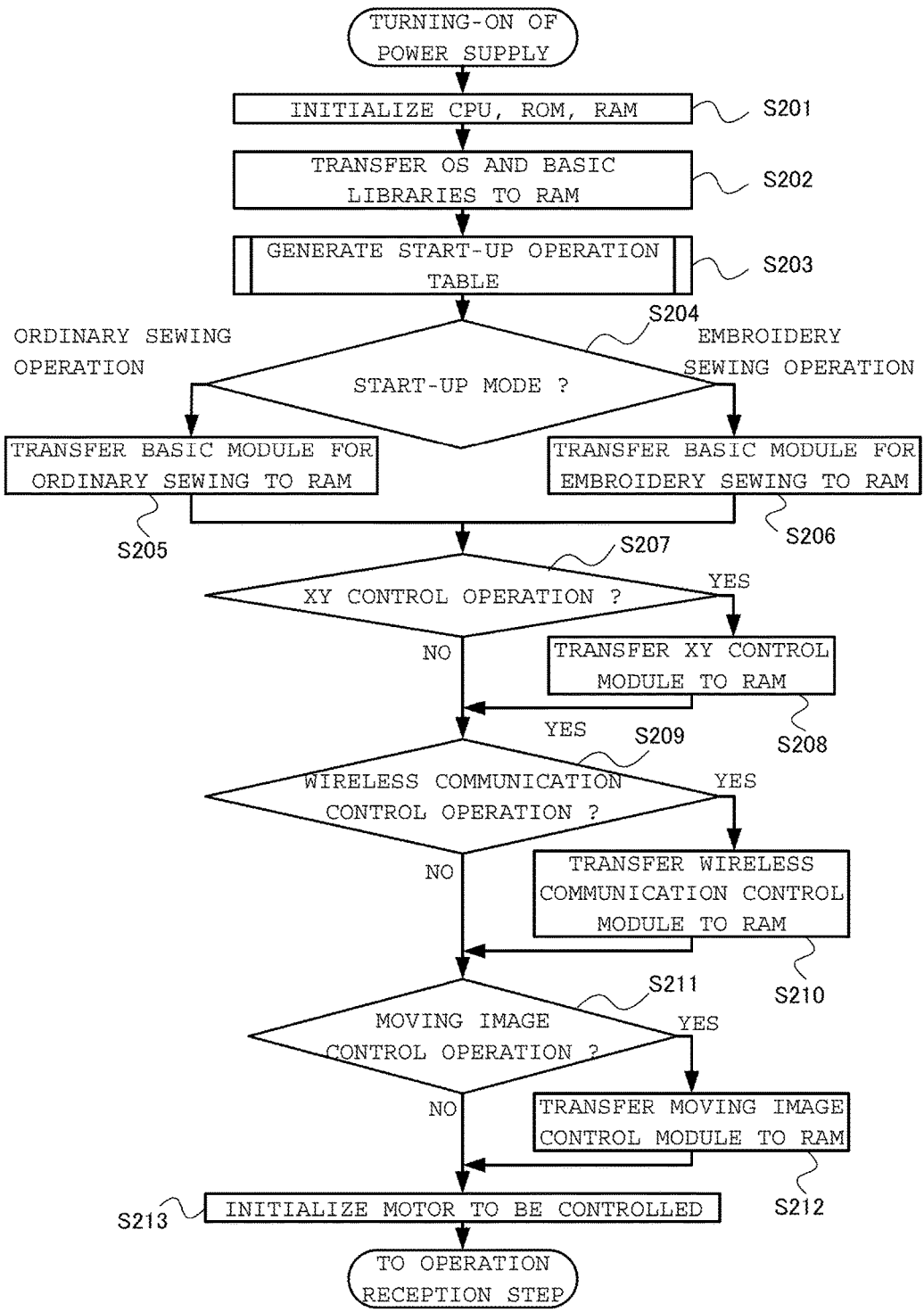

Description will be made with reference to FIG. 5 for the handling steps after the power supply is turned on for the sewing machine according to the present embodiment.

First, after the power supply is turned on for the sewing machine, an initializing handling step is executed for the CPU, ROM, and RAM, thereby providing a state in which the ROM and the RAM are operable (Step S201). After the ROM and the RAM each become operable, first, the OS and the basic libraries are expanded and stored in the RAM (Step S202). Next, as described above, the start-up operation table generating handling step is called based on the input information received from the sensor, the setting items set in the setting unit 123, the information with respect to the files stored in the file storage apparatus 150, or the like (Step S203).

The function module with respect to the operation mode that is to be started up in the first stage is expanded and stored in the RAM according to the start-up operation table thus generated (Step S204). When the operation mode to be started up first is to be set to the embroidery sewing mode, the function module with respect to the embroidery sewing is expanded and stored in the RAM (Step S206). On the other hand, when the operation mode to be started up first is to be set to the ordinary sewing mode, the function module with respect to the ordinary sewing is expanded and stored in the RAM (Step S205).

Subsequently, various kinds of control handling steps are expanded and stored in the RAM according to the start-up instructions registered in the start-up operation table. For example, when a start-up instruction with respect to an XY carriage control operation is present ("present" in Step S207), the function module with respect to the XY carriage control operation is expanded and stored in the RAM (Step S208).

Next, when a start-up instruction for the wireless communication control operation is present ("present" in Step S209), the function module with respect to the wireless communication control operation is expanded and stored in the RAM (Step S210). Furthermore, when a start-up instruction for the moving image control operation is present ("present" in Step S211), the function module with respect to the moving image control operation is expanded and stored in the RAM (Step S212).

After all the function modules for supporting the operations specified by the start-up operation table have been expanded and stored in the RAM, an initializing handling step is performed for the motor to be controlled, thereby providing an instruction reception state (Step S213).

[Operation Reception Handling Step]

Figure 6:
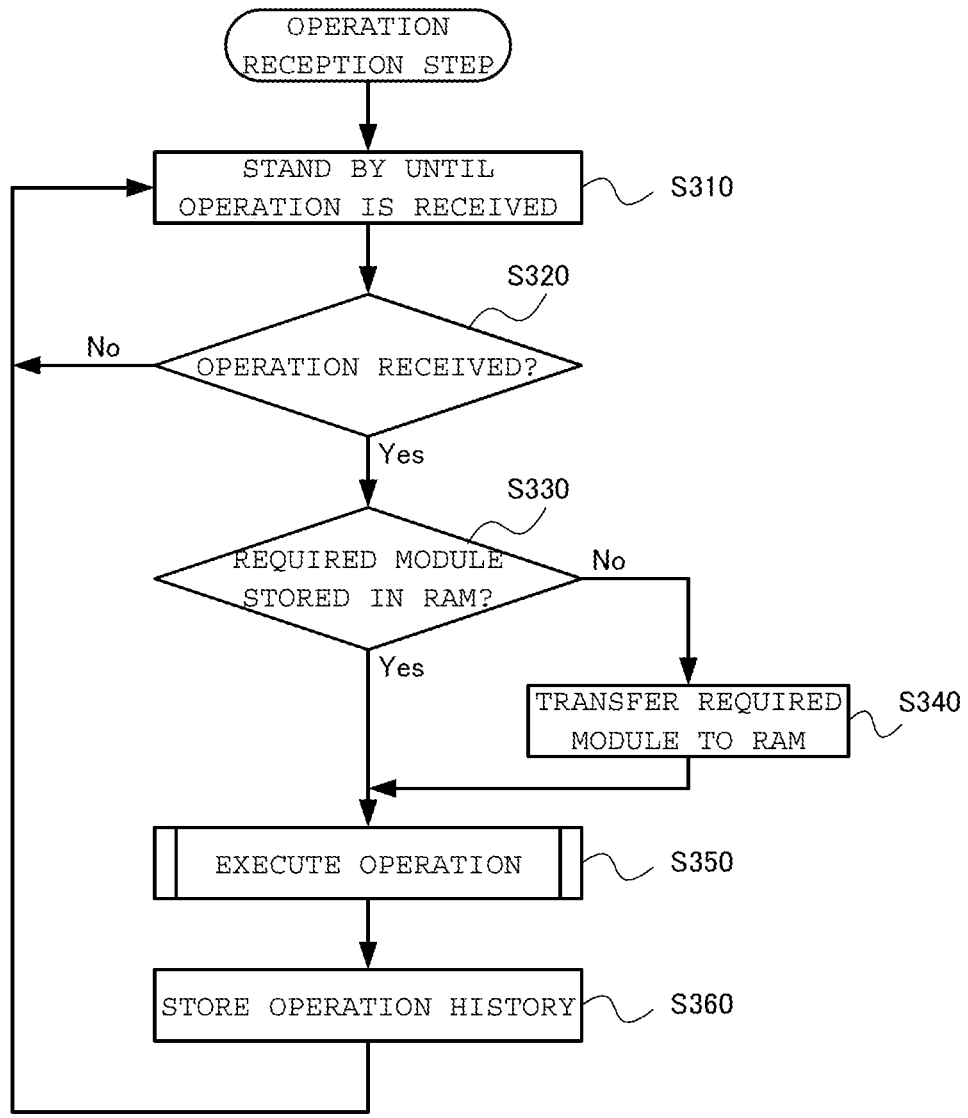
FIG. 6 is a flowchart showing the handling steps of the sewing machine in an operation reception step according to the first embodiment of the present invention.

Description will be made with reference to FIG. 6 regarding an operation reception handling step that allows the user to operate the sewing machine.

After the operation reception handling step is started up, the sewing machine stands by until the user performs an operation via the touch panel, tactile switch, or the like (Step S310). When the user performs a given operation ("YES" in Step S320), confirmation is made whether or not the function module for handling the user's operation has been expanded and stored in the RAM (Step S330). When judgment is made in this step that the function module for handling the user's operation has not been expanded and stored in the RAM ("NO" in Step S330), the function module for handling the user's operation is expanded and stored in the RAM before accepting the instruction from the user (Step S340).

Subsequently, after the handling step is executed according to the user's operation, the corresponding operation history is stored in the operation history storage unit 121 (Step S360). The operation history includes various kinds of data such as the date when the operation was performed, the screen via which the operation was performed, the kind of the operation, and the data that was the object of the operation.

It should be noted that, when the user performs a given operation before all the function modules are expanded and stored in the RAM, in some cases, the function module for supporting the user's operation has not been expanded and stored in the RAM. In this case, the operation for expanding and storing the function modules in the RAM, which is being performed in this stage, is suspended. Instead, a particular function module with respect to the user's operation is expanded and stored in the RAM.

[Effects of the Present Embodiment]

In the present embodiment, the firmware is configured in the form of divided function modules. In the start-up operation, only required function modules are loaded. Thus, such an arrangement provides improved responsiveness with respect to the user's operation. Furthermore, the function module loading operation is executed as a background operation according to the start-up operation table. That is to say, the loading operation ends for all the function modules as a background operation regardless of whether or not the user performs his/her desired operation. The order according to which the modules are to be sequentially loaded is determined based on the configuration and the features of the sewing machine. Thus, such an arrangement is capable of suppressing the loading operation for unnecessary function modules. That is to say, such an arrangement allows the start-up time to be reduced before the user performs a desired operation.

Second Embodiment

Description will be made with reference to FIGS. 7 through 10 regarding a sewing machine according to a second embodiment. It should be noted that description will be made below regarding an example in which the mounting of an embroidery frame on the sewing machine is not detected, the wireless LAN function is enabled, and moving image files are stored in the file storage apparatus 150. The overall configuration and the electrical configuration of the sewing machine are the same as those described in the first embodiment. Accordingly, detailed description thereof will be omitted.

[Start-Up Operation Table Generating Handling Steps]

Before description of the actual handling steps, description will be made with reference to FIG. 7 regarding the outline of the start-up operation table generating steps.

Figure 7:
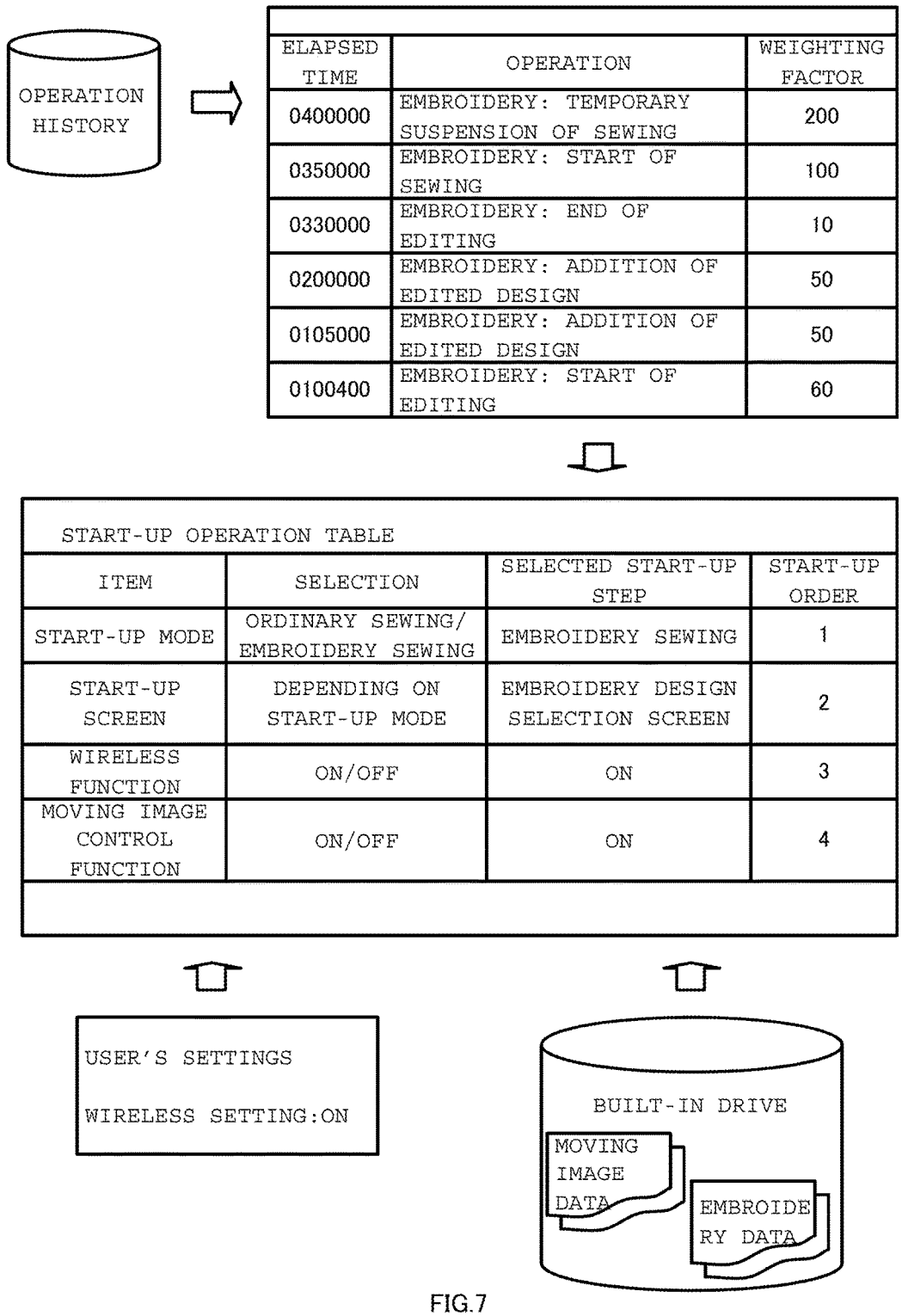
FIG. 7 is a diagram showing an outline of a start-up operation table generating steps performed by a sewing machine according to a second embodiment of the present invention.

In the present embodiment, as shown in FIG. 7, effective information that can be used to generate such a start-up operation table includes operation history information, setting unit setting (user's setting) information, and built-in drive information.

A database for storing the operation history information stores the elapsed time from the turning on of the power supply for the sewing machine up to each operation, the operation content, and the weighting factor, in a linked manner. It should be noted that the weighting factor is derived based on the user's operation history stored in the operation history storage unit. Specifically, the weighting factor is determined based on the values with respect to the user's operation such as the elapsed time, the frequency of use, or the like, or based on the most recent operation content. When there are multiple function modules with respect to the operation history, the priority according to which the function modules are to be sequentially loaded is determined based on the value of the weighting factor, thereby determining the start-up mode. Furthermore, the information that the wireless setting is set to the ON state is acquired based on the setting (user's setting) information set in the setting unit. Moreover, such an arrangement acquires the information that the built-in drive stores moving image data and embroidery data.

The start-up operation table is generated based on the aforementioned information. First, the operation linked to the greatest weighting factor is the "embroidery: temporary suspension of sewing" operation in the operation history information. In this case, judgment is made that the start-up mode is to be set to the embroidery sewing mode, and the start-up priority "1" is assigned to the embroidery mode. Next, judgment is made that the start-up screen is to be set to the embroidery execution screen based on the judgement result that the start-up mode is to be set to the embroidery mode. Thus, the start-up priority "2" is assigned to the embroidery execution screen. Furthermore, judgement is made that the wireless function is to be set to the ON state based on the wireless setting of "ON". Accordingly, the start-up priority "3" is assigned to the wireless function. Moreover, judgement is made that the moving image function is to be set to "ON" based on the fact that the built-in drive stores moving image data. Accordingly, the start-up priority "4" is assigned to the moving image function. With the present embodiment, the start-up operation table is generated as described above.

Figure 8:
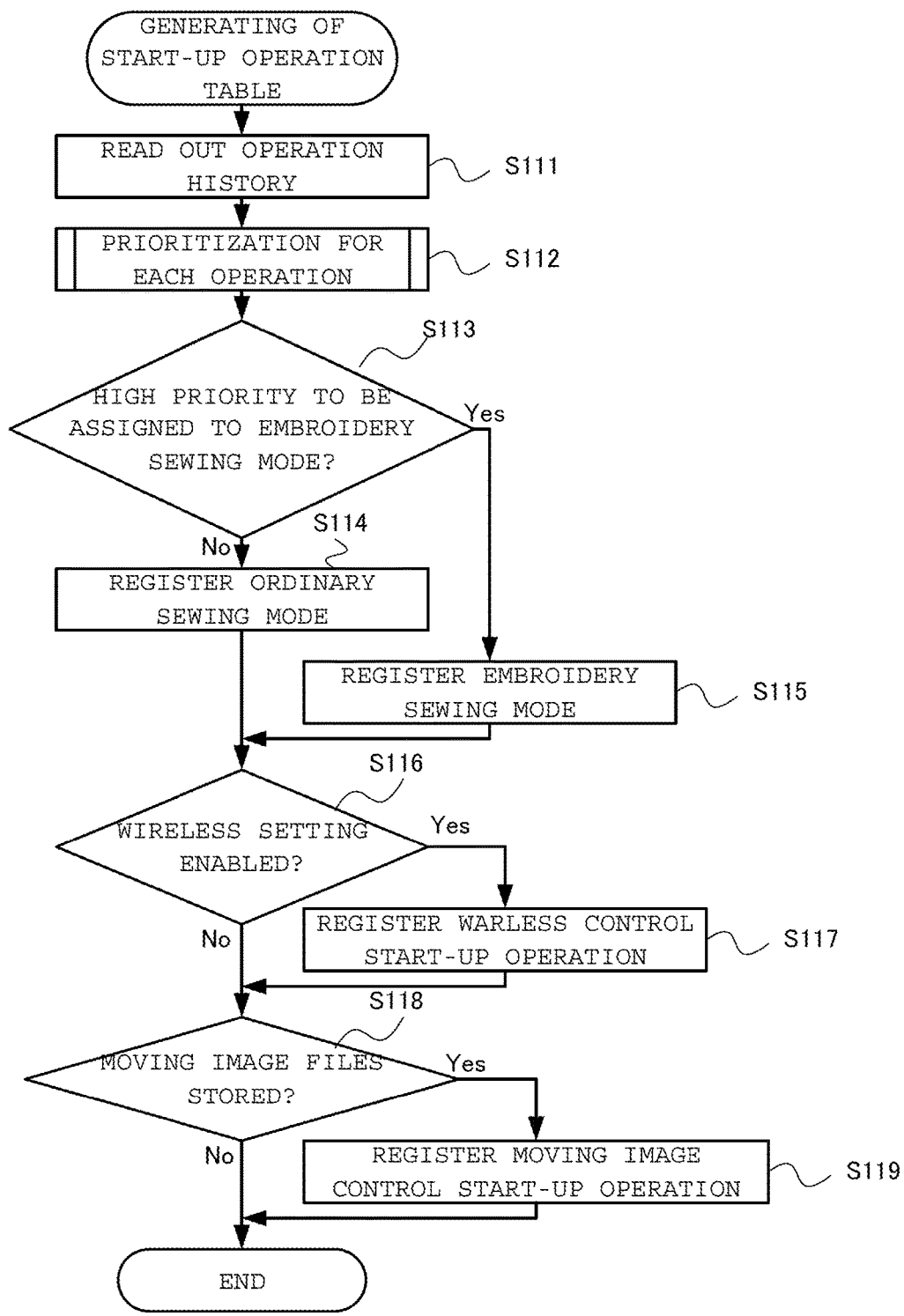
FIG. 8 is a flowchart showing the start-up operation table generating flow performed by the sewing machine according to the second embodiment of the present invention.

Description will be made below with reference to FIG. 8 regarding the start-up operation table generating handling steps according to the present embodiment based on a specific example of the aforementioned outline.

First, the operation history data is read out from the operation history storage unit 121 (Step S111), and prioritization is performed for each operation (Step S112). The operation prioritization is made based on the information with respect to the operations such as the frequency of use of each operation, the operation content, the operation immediately before the power supply is turned off, or the like, such that a high priority is assigned to an operation that is frequently used by the user. In the example described in the present embodiment, the latest operation is the temporary suspension of the embroidery sewing, which is linked to the greatest weighting factor. Accordingly, the highest priority is assigned to the operation of the "temporary suspension of embroidery sewing". It should be noted that detailed description thereof will be made later.

The mode to be started up in the first stage is determined based on the result of the prioritization made in Step S112 (Step S113). When the mode to be started up in the first stage matches the embroidery sewing mode ("YES" in Step S113), the "embroidery sewing mode" is registered in the start-up operation table (Step S115). On the other hand, when the mode to be started up in the first stage matches the ordinary sewing mode ("NO" in Step S113), the "ordinary sewing mode" is registered in the start-up operation table (Step S114). In the example described in the present embodiment, as described above, the highest priority is assigned to the operation of the "temporary suspension of embroidery sewing". In this case, the embroidery sewing mode is registered as the start-up mode.

Next, the setting content detection unit 124 detects the setting items set in the setting unit 123. For example, the setting content detection unit 124 detects whether or not the wireless setting is enabled in the setting unit 123 (Step S116). When the wireless setting is enabled ("YES" in Step S116), the wireless control start-up operation is registered in the start-up operation table (Step S117). In the example described in the present embodiment, the wireless function is set to "ON". Accordingly, the wireless control start-up operation is registered in the start-up operation table.

When the handling step represented by Step S117 ends, or otherwise in a case of "NO" in Step S116, the files stored in the file storage apparatus 150 are checked. For example, when the files stored in the file storage apparatus 150 include moving image files ("YES" in Step S118), the moving image control start-up operation is registered in the start-up operation table (Step S119). On the other hand, when the handling step represented by Step S119 ends, or otherwise in a case of "NO" in Step S118, the registration operation for the start-up operation table ends. It should be noted that description is being made in the present embodiment regarding an example in which the built-in drive stores moving image data. Accordingly, the "moving image control startup operation" is registered in the start-up operation table.

[Operation Prioritization Handling Step]

Figure 9:
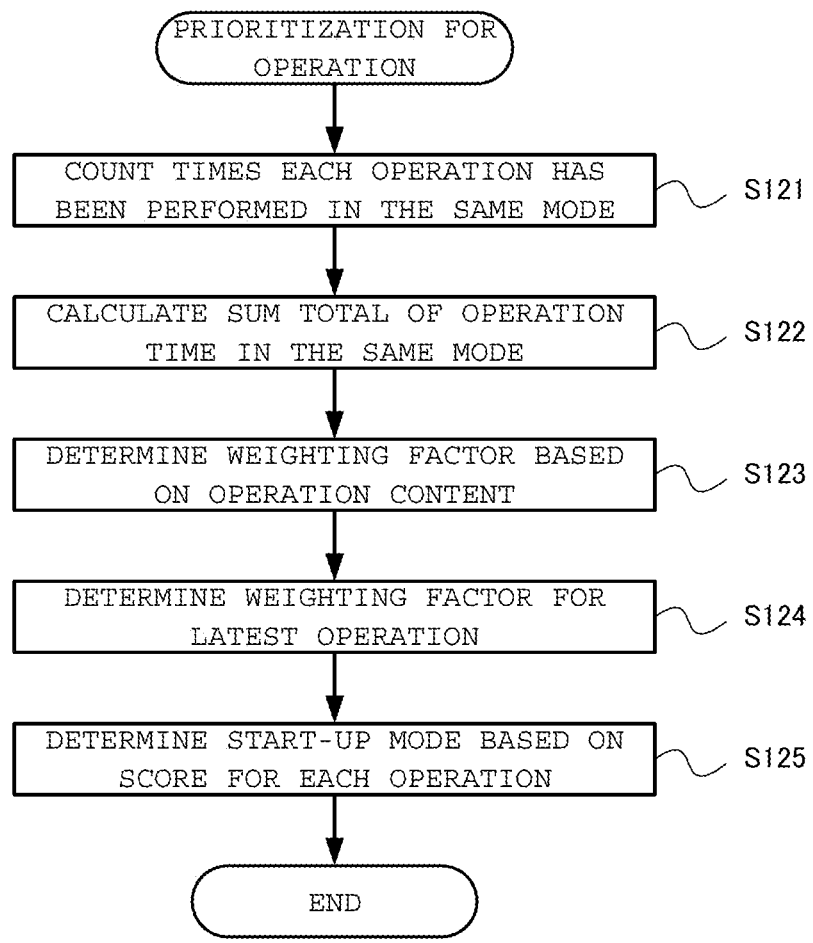
FIG. 9 is a flowchart showing the handling steps for determining a prioritization for each operation of the sewing machine according to the second embodiment of the present invention.

Here, the operation prioritization handling step is performed according to a procedure shown in FIG. 9. First, the number of times each operation has been performed in the same mode is counted based on the operation history data read out from the operation history storage unit 121 (Step S121). In the count operation, the number of times each operation has been performed is counted for each page and for each item.

Next, the sum total of the operation time is calculated for each mode (Step S122). Such calculation is performed based on the following reasoning. That is to say, typically, a function that has been used for a long operation time can be judged to be a function that is used frequently. Such an arrangement allows a priority list to be generated for various kinds of operations based on the number of times each operation has been performed and the operation time for which each operation has been performed.

Next, a weighting determination handling step is performed for the aforementioned list based on the operation content (Step S123). Such determination is made based on the following reasoning. That is to say, a higher priority is preferably assigned to a particular operation that has been performed by the user with a clear intention, such as a sewing operation that has actually been performed, a data editing operation, or the like, rather than ambiguous operations such as selection of the embroidery mode without a subsequent embroidery sewing operation.

Furthermore, such weighting determination is performed for the latest operation that was performed immediately before the power supply was turned off in the latest operation (Step S124). When the content of the latest operation matches an ambiguous operation such as selection of a design without any subsequent operation, a weighting factor that is not particularly large is assigned to such an operation. In contrast, when the content of the latest operation matches an operation such as a design editing operation performed by the user, a large weighting factor is assigned to such an operation. Such weighting determination is performed based on the following reasoning. That is to say, in this case, it can be anticipated that the user desires to continue the latest operation.

Subsequently, a list of points (score) is generated for each operation. The start-up mode is determined based on the score list thus generated (Step S125).

It should be noted that various modifications may be made for such weighting determination. For example, the weighting determination criterion to be preferentially used may be set to the latest operation that was performed immediately before the power supply was turned off, an operation that has been frequently used by the user, or the like. Also, such an arrangement may allow the user to set such a weighting determination criterion. After such a series of handling steps as described above is performed, such an arrangement is able to determine the mode that can be considered to be frequently used by the user.

[Handling Steps after Power Supply is Turned on]

Figure 10:
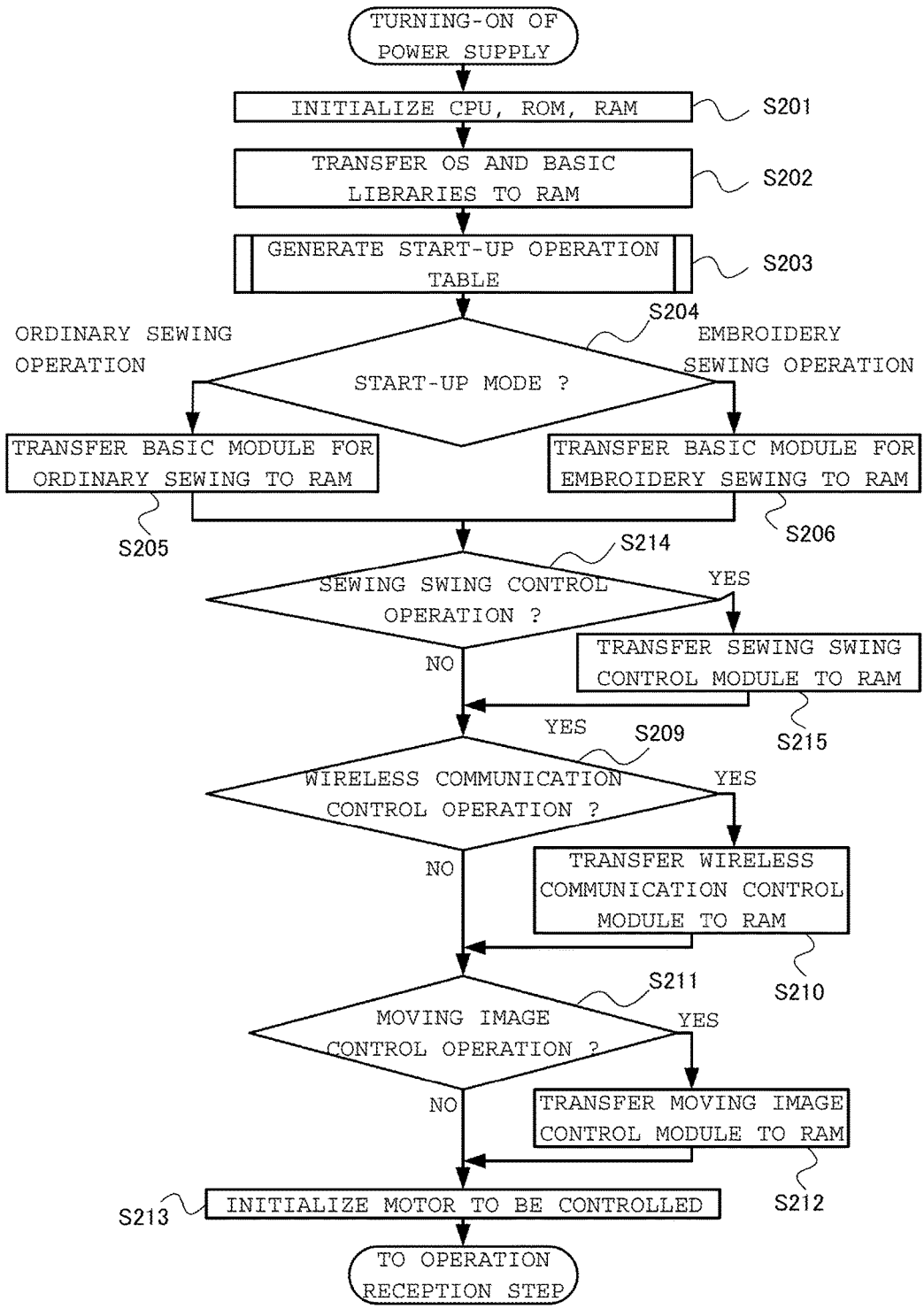

Description will be made with reference to FIG. 10 regarding the handling steps after the power supply is turned on for the sewing machine according to the present embodiment.

First, after the power supply is turned on for the sewing machine, an initializing handling step is executed for the CPU, ROM, and RAM, thereby providing a state in which the ROM and the RAM are operable (Step S201). After the ROM and the RAM each become operable, first, the OS and the basic libraries are expanded and stored in the RAM (Step S202). Next, as described above, the start-up operation table generating handling step is called based on the input information received from the sensor, the setting items set in the setting unit 123, the information with respect to the files stored in the file storage apparatus 150, or the like (Step S203).

The function module with respect to the operation mode that is to be started up in the first stage is expanded and stored in the RAM according to the start-up operation table thus generated (Step S204). When the operation mode to be started up first is to be set to the embroidery sewing mode, the function module with respect to the embroidery sewing is expanded and stored in the RAM (Step S206). On the other hand, when the operation mode to be started up first is to be set to the ordinary sewing mode, the function module with respect to the ordinary sewing is expanded and stored in the RAM (Step S205).

Subsequently, various kinds of control handling steps are expanded and stored in the RAM according to the start-up instructions registered in the start-up operation table. For example, when a start-up instruction with respect to a sewing swing control handling step is present ("present" in Step S214), the function module with respect to the sewing swing control handling step is expanded and stored in the RAM (Step S215).

Next, when a start-up instruction for the wireless communication control operation is present ("present" in Step S209), the function module with respect to the wireless communication control operation is expanded and stored in the RAM (Step S210). Furthermore, when a start-up instruction for the moving image control operation is present ("present" in Step S211), the function module with respect to the moving image control operation is expanded and stored in the RAM (Step S212).

After all the function modules for supporting the operations specified by the start-up operation table have been expanded and stored in the RAM, an initializing handling step is performed for the motor to be controlled, thereby providing an instruction reception state (Step S213).

[Effects of the Present Embodiment]

In the present embodiment, the firmware is configured in the form of divided function modules. In the start-up operation, only required function modules are loaded. Thus, such an arrangement provides improved responsiveness with respect to the user's operation. Furthermore, the order according to which the function modules are to be sequentially loaded is determined giving consideration to frequently used operations, the user's preference, or the like. Such an arrangement is capable of providing a reduced start-up time required for the sewing machine to provide the user's desired operation. Furthermore, the operation history is stored for each step. Such an arrangement is capable of preferentially reading out the function module for supporting the user's desired operation in the next start-up operation based on the operation history thus updated.

Third Embodiment

Figure 11:
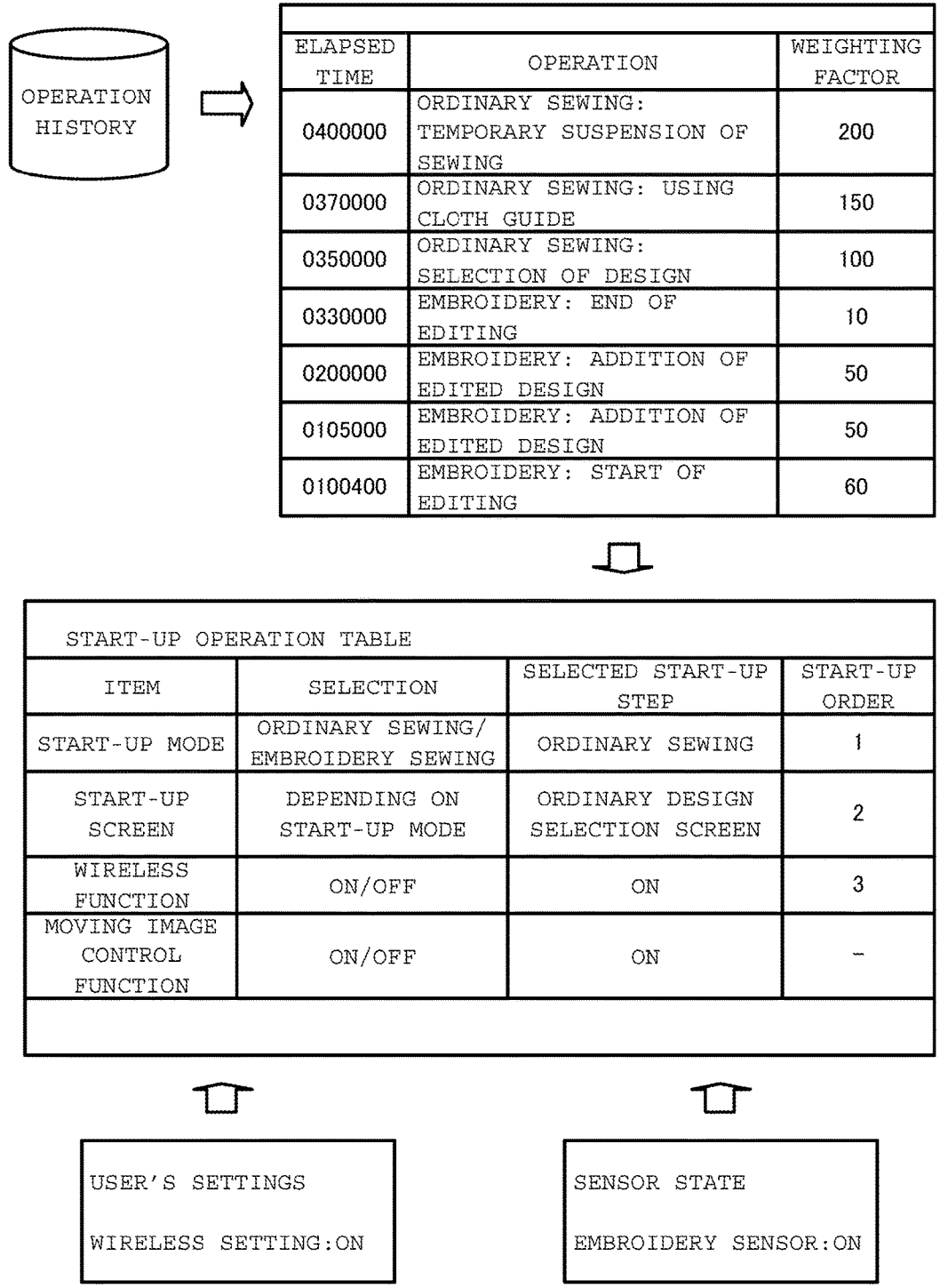
FIG. 11 is a diagram showing an outline of a start-up operation table generating steps performed by a sewing machine according to a third embodiment of the present invention.
Figure 12:
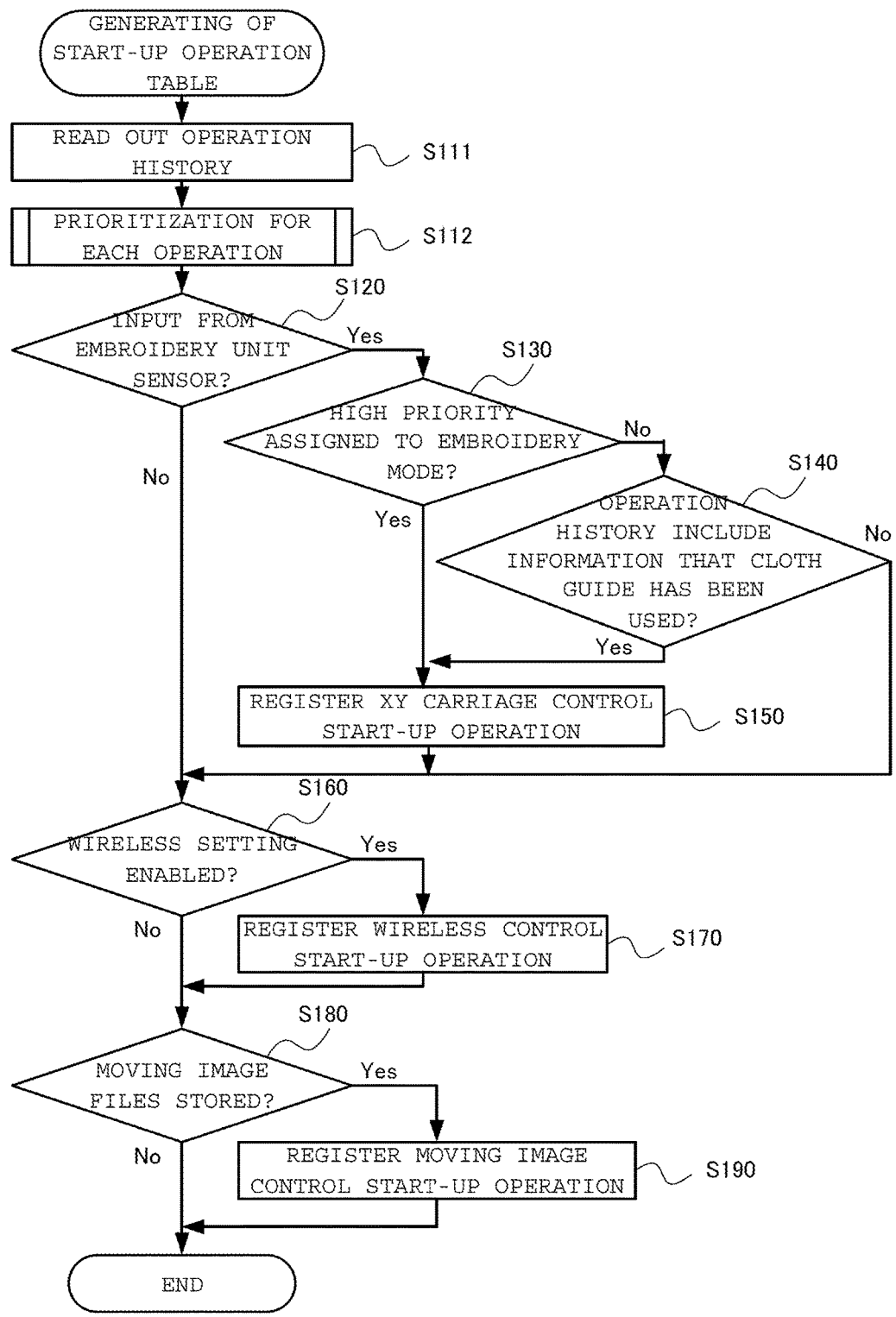
FIG. 12 is a flowchart showing the start-up operation table generating flow performed by the sewing machine according to the third embodiment of the present invention.
Figure 13:
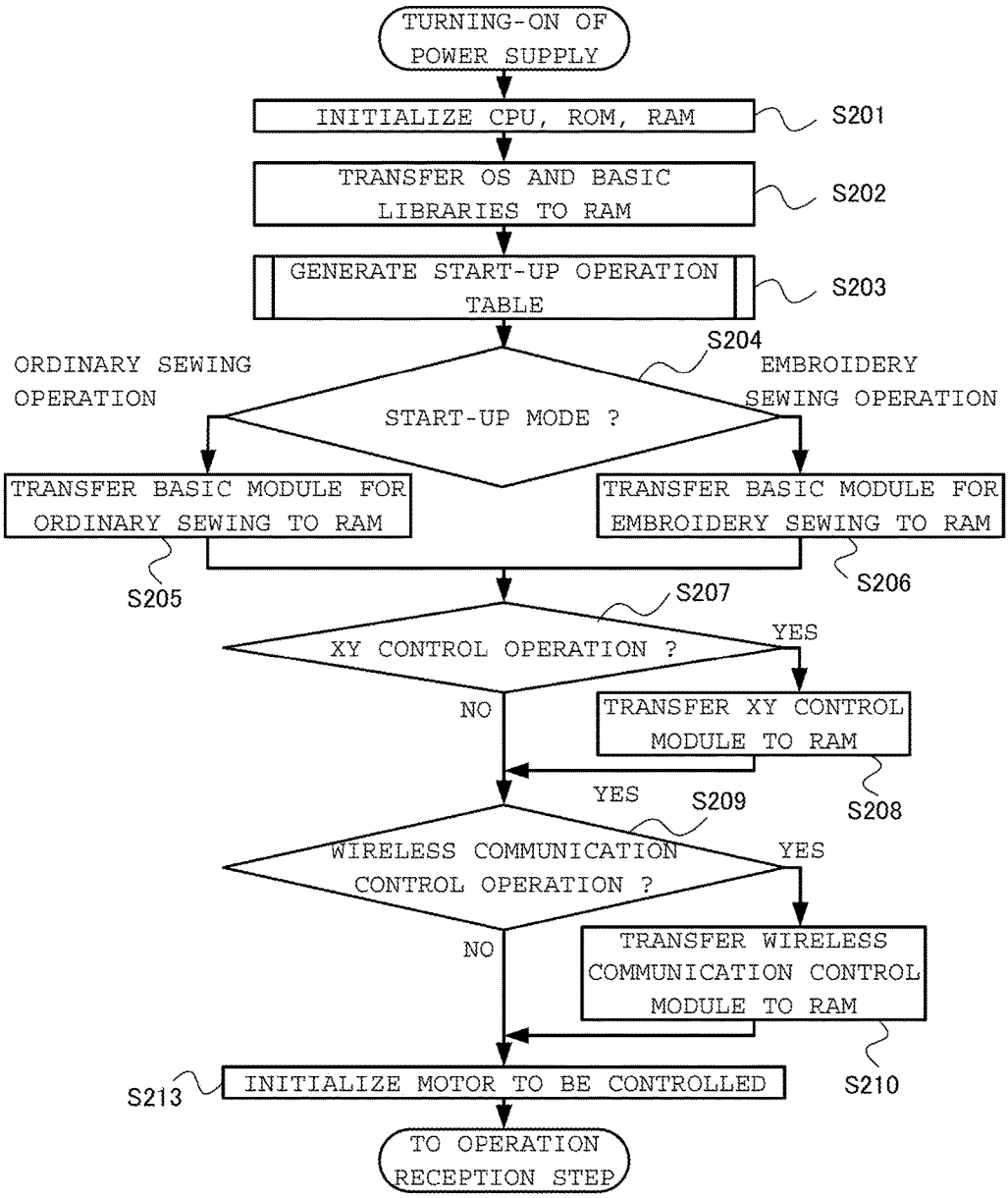

Description will be made with reference to FIGS. 11 through 13 regarding a sewing machine according to a third embodiment. It should be noted that description will be made below regarding an example in which the mounting of an embroidery frame on the sewing machine is not detected, the wireless LAN function is enabled, and moving image files are stored in the file storage apparatus 150. The overall configuration and the electrical configuration of the sewing machine are the same as those described in the first embodiment. Accordingly, detailed description thereof will be omitted.

[Start-Up Operation Table Generating Handling Steps]

Before description of the actual handling steps, description will be made with reference to FIG. 11 regarding the outline of the start-up operation table generating steps. In the present embodiment, as shown in FIG. 11, effective information that can be used to generate such a start-up operation table includes operation history information, setting unit setting (user's setting) information, and sensor state information.

A database for storing the operation history information stores the elapsed time from the turning on of the power supply for the sewing machine up to each operation, the operation content, and the weighting factor, in a linked manner. It should be noted that the weighting factor is derived based on the user's operation history stored in the operation history storage unit. Specifically, the weighting factor is determined based on the values with respect to the user's operation such as the elapsed time, the frequency of use, or the like, or based on the most recent operation content. When there are multiple function modules with respect to the operation history, the priority according to which the function modules are to be sequentially loaded is determined based on the value of the weighting factor, thereby determining the start-up mode. Furthermore, the information that the wireless setting is set to the ON state is acquired based on the setting (user's setting) information set in the setting unit. Moreover, the sensor state information allows the sewing machine to acquire the information that the embroidery frame sensor indicates the on state.

The start-up operation table is generated based on the aforementioned information. First, the embroidery frame sensor indicates the "ON" state, and the operation linked to the greatest weighting factor matches the "ordinary sewing; using cloth guide" operation in the operation history information. In this case, judgment is made that the start-up mode is to be set to the ordinary sewing mode, and the start-up priority "1" is assigned to the ordinary sewing mode. Next, judgment is made that the start-up screen is to be set to the ordinary sewing pattern selection screen based on the judgement result that the start-up mode is to be set to the ordinary sewing mode. Thus, the start-up priority "2" is assigned to the ordinary sewing pattern selection screen. Furthermore, judgement is made that the wireless function is to be set to the ON state based on the wireless setting of "ON". Accordingly, the start-up priority "3" is assigned to the wireless function. With the present embodiment, the start-up operation table is generated as described above.

Description will be made below with reference to FIG. 12 regarding the start-up operation table generating handling steps according to the present embodiment based on a specific example of the aforementioned outline.

First, the operation history data is read out from the operation history storage unit 121 (Step S111), and prioritization is performed for each operation (Step S112). The prioritization is made based on the information with respect to the operations such as the frequency of use of each operation, the operation content, the operation that was performed immediately before the power supply was turned off, or the like, such that a high priority is assigned to an operation that is frequently used by the user. In the example described in the present embodiment, the latest operation matches the temporary suspension of the ordinary sewing, which is linked to the greatest weighting factor. Accordingly, the highest priority is assigned to the operation of the "temporary suspension of embroidery sewing". It should be noted that such an operation is performed in the same way as in the second embodiment. Accordingly, detailed description thereof will be omitted.

The mode to be started up in the first stage is determined based on the result of the prioritization made in Step S112. Next, detection is made regarding the presence or absence of an input signal from the embroidery unit sensor (Step S120). When a signal input from the embroidery unit sensor is detected ("YES" in Step S120), judgment is made whether or not the highest priority is assigned to the embroidery sewing mode (Step S130). When the highest priority is assigned to the embroidery sewing mode ("YES" in Step S130), the XY carriage control operation is registered (Step S150). Conversely, when the highest priority is not assigned to the embroidery sewing mode ("NO" in Step S130), in the next step, detection is made regarding the presence or absence of the use history of the cloth guide (Step S140). When the use history is detected with respect to the cloth guide ("YES" in Step S140), the XY carriage control operation is registered (Step S150). In the example described in the present embodiment, the embroidery frame detection sensor indicates the ON state, and the use of the cloth guide is detected in the operation history. Accordingly, the "ordinary sewing mode" and the XY carriage control operation are registered in the start-up operation table.

When such an input signal from the embroidery unit sensor is not detected ("NO" in Step S120), when the XY carriage control operation has been registered (Step S150), and when the use history of the cloth guide is not detected ("NO" in Step S140), the setting content detection unit 124 makes detection regarding the presence or absence of a given setting item set in the setting unit 123. For example, detection is made for the setting unit 123 regarding whether or not the wireless setting is enabled (Step S160). When it is detected in this step that the wireless setting is enabled ("YES" in Step S160), the wireless control start-up operation is registered in the start-up operation table (Step S170). In the example described in the present embodiment, the wireless function is set to "ON". Accordingly, the wireless control start-up operation is registered in the start-up operation table.

When the handling step represented by Step S170 ends, or otherwise in a case of "NO" in Step S160, the files stored in the file storage apparatus 150 are checked. For example, when the files stored in the file storage apparatus 150 include moving image files ("YES" in Step S180), the moving image control start-up operation is registered in the start-up operation table (Step S190). On the other hand, when the handling step represented by Step S190 ends, or otherwise in a case of "NO" in Step S180, the registration operation for the start-up operation table ends. It should be noted that description is being made in the present embodiment regarding an example in which the built-in drive stores moving image data. Accordingly, the "moving image control startup operation" is registered in the start-up operation table.

[Handling Steps after Power Supply is Turned on]

Description will be made with reference to FIG. 13 for the handling steps after the power supply is turned on for the sewing machine according to the present embodiment.

First, after the power supply is turned on for the sewing machine, an initializing handling step is executed for the CPU, ROM, and RAM, thereby providing a state in which the ROM and the RAM are operable (Step S201). After the ROM and the RAM each become operable, first, the OS and the basic libraries are expanded and stored in the RAM (Step S202). Next, as described above, the start-up operation table generating handling step is called based on the input information received from the sensor, the setting items set in the setting unit 123, the information with respect to the files stored in the file storage apparatus 150, or the like (Step S203).

The function module with respect to the operation mode that is to be started up in the first stage is expanded and stored in the RAM according to the start-up operation table thus generated (Step S204). When the operation mode to be started up first is to be set to the embroidery sewing mode, the function module with respect to the embroidery sewing is expanded and stored in the RAM (Step S206). On the other hand, when the operation mode to be started up first is to be set to the ordinary sewing mode, the function module with respect to the ordinary sewing is expanded and stored in the RAM (Step S205).

Subsequently, various kinds of control operations are expanded and stored in the RAM according to the start-up instructions registered in the start-up operation table. For example, when a start-up instruction with respect to an XY carriage control operation is present ("present" in Step S207), the function module with respect to the XY carriage control operation is expanded and stored in the RAM (Step S208).

Next, when a start-up instruction for the wireless communication control operation is present ("present" in Step S209), the function module with respect to the wireless communication control operation is expanded and stored in the RAM (Step S210).

After all the function modules for supporting the operations specified by the start-up operation table have been expanded and stored in the RAM, an initializing handling step is performed for the motor to be controlled, thereby providing an instruction reception state (Step S213).

[Effects of the Present Embodiment]

In the present embodiment, the firmware is configured in the form of divided function modules. In the start-up operation, only required function modules are loaded. Thus, such an arrangement provides improved responsiveness with respect to the user's operation. Furthermore, required modules and data are preferentially read out based on the start-up operation table generated based on a function set by the user, information with respect to the stored files, and the like, in addition to the sewing machine operation mode (embroidery sewing mode, ordinary sewing mode) thus determined. Thus, such an arrangement allows the user to execute a desired operation in a short period of time after the power supply is turned on for the sewing machine.

It should be noted that the operation of the sewing machine may be recorded on a computer-system-readable or computer-readable recording medium in the form of a program. Also, such a program thus recorded on the recording medium may be read out and executed by the sewing machine, thereby providing the sewing machine according to the present invention. Examples of such a computer system or computer as used here include an operating system and a hardware component such as peripheral devices or the like.

Also, the "computer system" or "computer" encompasses website providing environments (or display environments) that employ the WWW (World Wide Web) system. Also, the aforementioned program may be transmitted to other computer systems or computers from a given computer system or computer that stores this program in its storage apparatus or the like via a transmission medium or otherwise transmission waves in the transmission medium. The "transmission medium" as used here to transmit a program represents a medium having a function of transmitting information, examples of which include networks (communication networks) such as the Internet and communication lines (communication wires) such as phone lines, etc.

Also, the aforementioned program may be configured to provide a part of the aforementioned function. Also, the aforementioned program may be configured as a so-called differential file (differential program), which is to be combined with a different program stored beforehand in a computer system or a computer in order to provide the aforementioned function.

Detailed description has been made with reference to the drawings regarding the embodiment according to the present invention. However, such a specific configuration is not restricted to the embodiment. Rather, various kinds of changes in design or the like may be made without departing from the scope of the present invention. For example, description has been made in the aforementioned embodiments regarding an example in which moving image files are stored. In a case in which a function module is prepared for audio files, the present invention may be applied to such an arrangement configured to store such audio files. In a case in which the kind of the embroidery frame can be detected, such an arrangement may be configured to read out a corresponding function module according to the kind of the embroidery frame thus detected. That is to say, there is a difference in the embroidery size that can be supported according to the kinds of the embroidery frames. Thus, the display manner or the display methods for displaying the embroidery list may be switched according to the kind of the embroidery frame thus detected. Also, when the embroidery size is larger than the supported size, the readout operation may be disabled for such an embroidery design.

REFERENCE SIGNS LIST

101 CPU (processor)
102 ROM
103 RAM
104 operation screen
105 GUI screen
106 tactile switch
107 loading order determination unit
108 loading unit
109 start-up unit
110 sensor
111 embroidery frame detection sensor unit (embroidery frame sensor)
112 embroidery unit sensor unit (embroidery unit sensor)
121 operation history storage unit (operation history storage)
122 score calculation unit
123 setting unit
124 setting content detection unit
130 USB communication apparatus
140 wireless LAN communication apparatus
150 file storage apparatus
160 sewing machine motor control apparatus
170 swing/feed motor control apparatus
180 X-Y motor control apparatus.

What is claimed is:

1. A sewing machine comprising:
a processor;
a module storage that stores a plurality of function modules; and
an embroidery frame sensor;
wherein the processor:

determines, based on a use situation of a user, an order according to which the function modules are to be loaded from the module storage;
loads the function modules according to the loading order thus determined by the processor; and
starts up the loaded function modules, and
wherein, when the embroidery frame sensor detects that an embroidery frame has been mounted, the processor determines a loading order with the function module with respect to embroidery sewing as the highest-ranking from among the plurality of function modules.

2. The sewing machine according to claim 1, further comprising an embroidery unit sensor,
wherein, when the embroidery sensor detects that an embroidery unit having an arm has been mounted, the processor determines a loading order with the function module with respect to embroidery sewing as the highest-ranking from among the plurality of function modules.

3. The sewing machine according to claim 1, further comprising an embroidery unit sensor,
wherein, when the embroidery unit sensor detects that an embroidery unit having an arm has been mounted, and when the embroidery unit sensor detects an open state of the arm of the embroidery unit, the processor determines a loading order with the function module with respect to embroidery sewing as the highest-ranking from among the plurality of function modules.

4. The sewing machine according to claim 1, further comprising an embroidery unit sensor,
wherein, when the embroidery unit sensor does not detect that the embroidery unit has been mounted, the processor determines a loading order with the function module with respect to ordinary sewing as the highest-ranking from among the plurality of function modules.

5. The sewing machine according to claim 1, further comprising an operation history storage that stores an operation history of a user,
Wherein the processor determines a loading order with a function module related to the operation history of the user stored in the operation history storage as the highest-ranking.

6. The sewing machine according to claim 5,
wherein the processor calculates a score for a user operation content by performing weighting determination based on the operation history of the user stored in the operation history storage, and
wherein the processor determines, based on the calculated score, a loading order according to which the plurality of function modules, which are related to the operation history of the user, are to be loaded.

7. The sewing machine according to claim 1,
wherein the processor allows a user to make a setting with respect to whether or not a given function module is to be loaded.

8. The sewing machine according to claim 1, further comprising a file storage,
wherein, after the processor loads the aforementioned function modules, the loading unit loads a function module for supporting files stored in the file storage.

9. A sewing machine according to claim 1, wherein, when the user performs an operation that requires a corresponding function module before a loading operation is completed for all the function modules, and when such a required function module has not been loaded, the loading operation that is being carried out is suspended, and the required function module for supporting the user's operation is loaded.

10. A start-up management method for a firmware used in a sewing machine comprising a module storage that stores a plurality of function modules, a processor, and an embroidery frame sensor, the start-up management method comprising:
determining, by the processor, based on a use situation of the user, an order according to which the function modules are to be loaded from the module storage;
loading, by the processor, the function modules according to the loading order thus determined by the loading order determination unit;
starting up, by the processor, the loaded function modules; and
determining, by the processor, a loading order with the function module with respect to embroidery sewing as the highest-ranking from among the plurality of function modules, when the embroidery frame sensor detects that an embroidery frame has been mounted.

11. A non-transitory machine-readable recording medium for storing a program for instructing a sewing machine to execute a start-up management method for a firmware used in the sewing machine, wherein the sewing machine comprises:
a processor;
a module storage that stores a plurality of function modules; and
an embroidery frame sensor,
wherein the start-up management method comprises:
determining, by the processor, based on a use situation of the user, an order according to which the function modules are to be loaded from the module storage;
loading, by the processor, the function modules according to the loading order thus determined by the processor; and
starting up, by the processor start-up unit, the function modules loaded by the loading unit; and
determining, by the processor, a loading order with the function module with respect to embroidery sewing as the highest-ranking from among the plurality of function modules, when the embroidery frame sensor detects that an embroidery frame has been mounted.

* * * * *